UNITED STATES PATENT OFFICE.

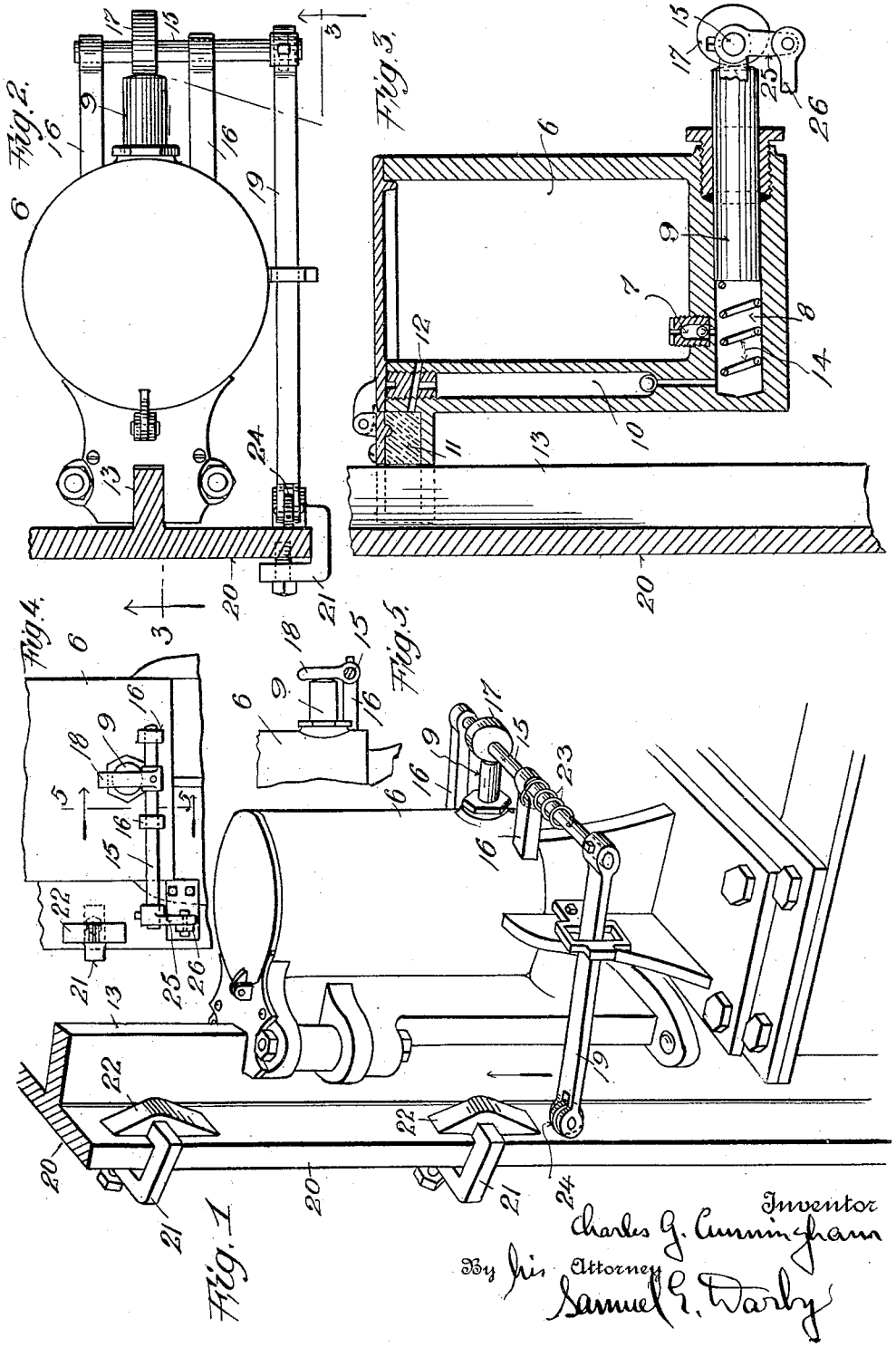

CHARLES G. CUNNINGHAM, OF NEW YORK, N. Y.

LUBRICATING DEVICE.

1,198,704.  Specification of Letters Patent.  Patented Sept. 19, 1916.

Application filed February 28, 1916. Serial No. 80,924.

*To all whom it may concern:*

Be it known that I, CHARLES G. CUNNINGHAM, a citizen of the United States, residing at New York, county of Bronx, State of New York, have made a certain new and useful Invention in Lubricating Devices, of which the following is a specification.

This invention relates to lubricating devices for elevator guides, wearing surfaces of machinery or other purposes.

The object of the invention is to provide a structure of lubricating device which is simple, economical to manufacture, and efficient in operation.

A further object is to provide a lubricating device of the nature and for the purpose noted wherein the lubricant is supplied to the surface to be lubricated through the periodic positive operation of a pump piston or plunger.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the drawing, Figure 1 is a view in perspective, parts broken off, showing one form of lubricating device embodying my invention as applied to an elevator guide. Fig. 2 is a view in top plan of the same. Fig. 3 is a view in vertical central section on the line 3, 3, Fig. 2, through the lubricating device showing a slightly modified arrangement for operating the pump plunger or piston. Fig. 4 is a view in front elevation, parts broken off, showing another slightly modified form of operating connections for the pump piston. Fig. 5 is a broken detail view in section on the line 5, 5, Fig. 4.

The same part is designated by the same reference numeral wherever it occurs throughout the several views.

In my application Serial No. 41,322, filed July 22, 1915, I have shown and described a construction of automatic lubricating device wherein the lubricant is supplied to the surface to be lubricated by means of a pump piston or plunger operating to deliver the lubricant from a tank to the lubricant applying devices. In the form of structure therein shown as one embodiment of my invention the pump plunger or piston is operated automatically by the swaying movement of an elevator car. In accordance with my present invention I propose to positively actuate the pump piston or plunger periodically or at fixed points in the travel of the car or other moving part in connection with which the lubricating device is employed, thereby adapting the device for use without depending upon the swaying motion of the moving part and in situations where there may not be any swaying movement of such part.

In the drawing the lubricant receptacle 6, communicates through a valve controlled passage 7, with the chamber 8 in which operates the piston or plunger 9, to deliver the lubricant through a valve controlled duct 10, to a packing pad or the like 11, by which the lubricant is applied to the surface to be lubricated, shown in this instance as the stem 13 of an elevator guide T-rail. Any excess of lubricant drains back into the tank through the duct 12. The pump piston or plunger 9 is normally pressed outwardly in its chamber 8 by means of a spring 14.

The parts so far described may be the same as disclosed in my application above referred to but my present invention, in its broadest scope is not to be limited or restricted to this structure nor to the details thereof.

In accordance with my present invention I mount a rock shaft 15 in suitable bearings, such as arms or brackets 16, carried by the frame or casing of the device, and I arrange said shaft to extend transversely across the line of longitudinal movement of the piston or plunger 9, adjacent its outer end. In the form shown in Figs. 1, 2 and 3, I mount a cam 17 on the rock shaft 15, and arrange the same for the outer end surface of the piston or plunger 9 to normally bear against that portion of the surface of said cam which has the least eccentricity. With this arrangement it will be seen that by rocking the shaft 15, the pump piston will be forced longitudinally into its chamber 8, against the tension of spring 14, to effect its working stroke and deliver lubricant through duct 10 to the applying device or material 11, the spring 14 operating to maintain the outer end of the piston in bearing contact with the cam 17.

Instead of the circular form of cam shown in Figs. 1, 2, and 3, the shaft 15, may be equipped with an upstanding arm 18, as shown in Figs. 4 and 5, and against which the outer end of the piston 9 bears. In this case the shaft 15, will be arranged in a plane slightly below the line of movement of the piston, as clearly shown.

The shaft 15 may be rocked in many different ways. A simple arrangement for this purpose is shown in Figs. 1 and 2, wherein an arm 19 is connected to the shaft 15, and having its free end extended toward and into proximity with the flange 20 of the T-rail for instance, in case of application of the lubricator to an elevator guide. At suitable points in the length of the flange 20 of the T-rail guide I secure thereto clamps 21, carrying the cam projections 22, which are arranged in the path of travel of the free end of arm 19, to be engaged thereby, and rocked in one direction or the other according to the direction of travel of the car, as the free end of said arm 19, wipes therepast. Any suitable means may be employed to normally maintain the shaft 15, its piston engaging means and its rocking or actuating arm in centered horizontal or neutral position with respect to the piston, and to restore these parts to their normal positions after they have been displaced by a cam projection 22. I have shown a simple structure for accomplishing this and which consists of a spring 23, see Fig. 1, coiled upon the shaft 15, and having one end connected to a fixed part of the casing, as bracket 16, and the other to the shaft 15. With this arrangement, assuming the elevator car or other moving part to be traveling in the direction indicated by the arrow in Fig. 1, it will be readily understood that when the free end of arm 19 comes into engagement with a cam projection 22, said arm is depressed or displaced downwardly as it wipes past the cam projection, thereby rocking shaft 15, and causing the pump piston to be projected into its chamber 8, the parts concerned in the operation of said piston returning to their normal position after the free end of arm 19 clears or moves past the cam projection 22. If desired and in order to reduce friction and avoid undue noise the free end of arm 19 may be equipped with an anti-friction roller 24.

Instead of a rocking arm arrangement such as above described, for rocking the shaft 15, said shaft may be provided with a crank arm 25, see Figs. 3, and 4, to which is pivotally connected an arm 26, the free end of said arm engaging the cam projections 22, as the car proceeds along its guide, whereby said arm is projected endwise by the cams thereby rocking the crank arm 25, and hence also the shaft 15.

Many other variations in such details will readily occur to persons skilled in the art without departure from the spirit and scope of my invention as defined in the claims.

I have found, in practice, that a movement of from one-sixteenth to one-quarter of an inch of the pump piston in its working or delivery stroke is sufficient for practical purposes, and therefore the cam 17, may be proportioned accordingly.

By suitably placing the cam projections 22 with reference to the extent of travel of the car or other moving part, it will be readily seen that I will secure the automatic position actuation of the pump piston at any desired periodic intervals.

Having now set forth the objects and nature of my invention, and various practical embodiments thereof, what I claim as new and useful, and of my own invention, and desire to secure by Letters Patent, is, 1. In a lubricating device, the combination with a tank and pump piston, of a shaft extending transversely of the line of action of said piston, means carried by the shaft to engage and actuate said piston in its working stroke, when said shaft is rocked, and means to positively rock said shaft.

2. In a lubricating device, the combination with a tank and pump piston, of a shaft extending transversely of the line of action of said piston, means carried by the shaft to engage and actuate said piston in its working stroke, when said shaft is rocked, an arm connected to said shaft, and means to engage said arm and positively move the same to rock the shaft.

3. The combination with a guide to be lubricated of a tank mounted to move along the guide, a piston to deliver lubricant from the tank to the guide, a rock shaft, carried with the tank and having means to engage the piston and actuate the same in its working stroke, an arm connected to said shaft and operating, when actuated, to rock the same, and means carried by the guide to engage said arm to actuate the same.

4. The combination with a guide to be lubricated of a tank mounted to move along the guide, a piston to deliver lubricant from the tank to the guide, a rock shaft, carried with the tank and having means to engage the piston and actuate the same in its working stroke, an arm connected to said shaft and operating when actuated, to rock the same, and means carried by the guide and arranged in the path of the free end of said arm to engage and positively actuate the same.

5. In a lubricating device, a traveling tank and a pump piston to deliver lubricant therefrom to the member to be lubricated in combination with a rock shaft carried with said tank and having means to engage said piston, when said shaft is rocked, to operate the piston in its working stroke, cam projections carried by the member to be lubricated, and means engaged by said projections in the travel of the tank to positively rock said shaft.

6. In a lubricating device, a traveling tank and a pump piston to deliver lubricant therefrom to the member to be lubricated in combination with a rock shaft carried with said tank and having means to engage said piston, when said shaft is rocked, to operate the piston in its working stroke, means operating to normally maintain said shaft and its piston engaging means in central or neutral position with respect to said piston.

In testimony whereof I have hereunto set my hand, on this 23rd day of February, A. D. 1916.

CHARLES G. CUNNINGHAM.

Copies of this patent may be obtained for five cents each, by addressing the "Commissioner of Patents, Washington, D. C."